United States Patent Office 2,980,612
Patented Apr. 18, 1961

2,980,612

WATER-RESISTANT NON-SOAP GREASES

Ralph A. Potter, Fullerton, Calif., assignor to Union Oil Company of California, Los Angeles, Calif., a corporation of California No Drawing. Filed Aug. 12, 1957, Ser. No. 677,770

16 Claims. (Cl. 252—28)

This invention relates to water-resistant non-soap greases. More particularly this invention relates to water-resistant greases thickened with finely divided silica and/or alumina to which a water dispersible, oil-soluble, polyoxyethylene derivative of a sorbitan partial ester of a higher fatty acid is added to impart such water resistance.

Lubricating greases having valuable characteristics have been prepared using as thickening agents finely divided silica and/or alumina in the form of silica or alumina aerogels or in the form of colloidal silica or alumina. Greases prepared in this manner, although having many characteristics making them desirable lubricants for many purposes are deficient in certain characteristics. Thus they are not water resistant and their reversibility characteristics on heating and cooling and on working are not all that is desired.

Powdered thickening agents of the types indicated have been improved for use in preparing greases and fair water resistance has been obtained by treating the powdered materials prior to their use in greases with various agents which are found to react with and/or coat the particles to improve their water resistance characteristics. Thus, such materials, which are initially hydrophilic, have been treated with alcohols under certain conditions which treatment tends to make them hydrophobic. Moreover, such powdered materials have been treated with alkyd resins and the like which also appears to improve their water resistance. Such treatments, however, are costly, making greases prepared from these treated materials costly.

It is now found that water-resistant greases can be prepared using the untreated powdered silica and/or alumina thickening agents by adding a surface active agent of the type referred to herein as water-dispersible, oil-soluble, polyoxyethylene derivatives of sorbitan partial esters of higher fatty acids to the lubricating oil to which the powdered materials are subsequently added or by first adding the powdered materials to the lubricating oils to produce greases and then adding the mentioned type of surface active agent, and in either case, heating the resulting greases to a temperature sufficient to eliminate moisture from the system, i.e. temperatures above about 250° F. The resulting greases are not only water resistant but they have good reversibility characteristics and are otherwise entirely satisfactory for use in most grease applications.

It is an object of this invention to produce water-resistant non-soap greases.

A further object of this invention is to produce water-resistant greases having good reversibility characteristics.

Another object of this invention is to provide a relatively simple and inexpensive method of producing non-soap greases having exceptional water resistance and good reversibility characteristics.

It is a more particular object of this invention to produce water-resistant greases thickened with finely divided silica and/or alumina in which the water resistance is imparted by incorporating in the grease relatively small amounts of certain polyoxyethylene derivatives of sorbitan partial esters of higher fatty acids.

The above and related objects are accomplished by incorporating in a lubricating oil sufficient finely-divided silica and/or alumina to produce the desired degree of thickening, adding to the resultant thickened oil small amounts of a preferentially oil-soluble but water dispersible polyoxyethylene derivative of soribtan partial esters of higher fatty acids and heating the composition to a minimum temperature of 250° F. and preferably to a temperature of 300–325° F. and then cooling the grease. As an alternative method, to the lubricating oil which is to be used in preparing the grease, is added small amounts of the mentioned surface-active agent and to the oil containing this additive material is then added the desired amount of finely divided silica and/or alumina to produce the desired degree of thickening, and the product is mixed with paddle agitation or by milling and subsequently heated to a temperature of at least 250° F. and preferably to at least 300–325° F., as above indicated.

Powdered or finely divided silicas and aluminas, which are to be used, are available on the market and are known in the trade as silica and alumina aerogels or as colloidal silica or alumina. For example, particularly satisfactory colloidal silica having a particle size of 0.015–0.02 micron and a specific surface area of 175–200 square meters per gram is available under the name of Cab-O-Sil from Godfrey L. Cabot, Inc. of Boston, Massachusetts. The silica and alumina aerogels which are available from various sources are also of extremely small particle size and are entirely satisfactory for producing the greases of this invention. Silica aerogels for example are obtainable from Monsanto Chemical Company under the name of Santocel. Santocel C is a silica aerogel having a specific surface area of approximately 157 square meters per gram.

In order to obtain best results the powdered silicas and aluminas to be used will have particle sizes in the range of from about 0.001 micron to about 1 micron. Preferably the particles will be less than about 0.5 micron and the average particle size will be between 0.005 and 0.1 micron. The specific surface area of the powdered thickening agent should be at least 10 square meters per gram and less than about 1000 square meters per gram and will preferably be between about 25 and about 500 square meters per gram. The electron microscope is used to determine particle sizes and the specific surface area is determined by the nitrogen absorption method as described in the publication symposium on new methods for particle size determination in the Sub-Sieve Range, American Society for Testing Materials, March 4, 1941, page 95, in an article "A new method for measuring the surface areas of finely divided materials and for determining the size of particles" by P. H. Emmett.

Although the description herein relates to both silica and alumina in finely divided form it is to be noted that the silicas are preferred for producing the greases of this invention. Greases produced using silica are somewhat superior to those prepared with alumina with respect to water resistance when the same proportions of water-proofing agents are employed.

As has been previously indicated the thickening agent may be silica or alumina or mixtures of silica with alumina in any proportion. Thus the amount of silica to be used will be between about 100% to 0% by weight of the total thickening agent and the amount of alumina will be correspondingly between 0% and 100% by weight of the total thickening agent.

Surface active agents which are useful in imparting water resistance and reversibility to greases thickened with the above-described non-soap thickeners include those compounds prepared by reacting a sorbitan partial ester with ethylene oxide. The sorbitan ester will contain 1, 2 or 3 ester groups and the acid used in preparing the partial ester will be a fatty acid, containing about 12 to 22 carbon atoms and preferably about 16 to 18 carbon atoms. The fatty acid may be saturated or unsaturated, i.e., it may contain one ethylenic double bond. Suitable acids may be obtained from tallow, lard oil, cottonseed oil, coconut oil, soybean oil, sperm oil, tall oil and other animal and vegetable oils and fats.

The amount of ethylene oxide to be reacted with the ester will vary depending upon the carbon atom content of the acid group or groups forming the ester. Generally the reacting ratio of ethylene oxide to ester will be between 2 and about 24 mols of the ethylene oxide to 1 mol of the ester. Compounds which are particularly suitable are obtainable from the Atlas Powder Company, Wilmington, Delaware, under the names Tween 61, Tween 65, Tween 81 and Tween 85. Tween 61 is polyoxyethylene sorbitan monostearate, Tween 65 is polyoxyethylene sorbitan tristearate, Tween 81 is polyoxyethylene sorbitan monooleate, and Tween 85 is polyoxyethylene sorbitan trioleate. These compounds are described in a 1950 publication by Atlas Powder Company entitled "Atlas Surface Active Agents." These compounds are soluble in mineral oil and are dispersible in either cold or warm water.

The sorbitan derivatives suitable for use such as those mentioned above are prepared by esterifying 1 to 3 of the hydroxyl groups of sorbitol with one or more long chain fatty acids described hereinabove to produce a sorbitan partial ester. The resulting partial ester is further reacted with ethylene oxide to form hydroxy-polyoxyethylene ether derivatives of the partial esters. These compounds are known as "polyoxyethylene sorbitan partial esters" and are referred to in this specification and in the appended claims using this terminology. Specific products will be referred to as polyoxyethylene sorbitan tristearate, polyoxyethylene sorbitan monooleate, etc. The polyoxyethylene group or groups will contain a sufficient number of oxyethylene groups to give the product an HLB value of 9 to 12 as described below.

Conditions under which the esterification reactions and etherification reactions are carried out are well known in the art but reference is here made to U.S. Patent No. 2,380,166 for a description of such methods. The methods of making the so-called Type B emulsifiers described in that patent are the methods employed in preparing the waterproofing agents of this invention. The only differences may lie in the amounts of oxyethylene employed. The amounts of this material to be employed in preparing the agents of this invention have been described hereinabove and are further described below.

Although agents which are mineral oil-soluble and are also dispersible in water at room or slightly elevated temperatures can be selected and these criteria may be used to define the characteristics of surface active agents suitable for use in this invention, another means of determining the correct hydrophile-lipophile balance may be employed. The hydrophile-lipophile balance value (HLB value) is an empirical numerical value which expresses the relative hydrophilic and lipophilic properties of a material. A high HLB value is indicative of strong hydrophilic properties whereas a low HLB value indicates strong lipophilic properties. A material having an HAB value of above about 12 is highly hydrophilic. One having an HLB value of less than about 9 is highly lipophilic. Surface active agents suitable for use in this invention have HLB values between about 9 and about 12 and preferably between about 9.5 and about 11.5. Methods of determining and of calculating HLB values are described in an article by William C. Griffin in the Journal of the Society of Cosmetic Chemists, volume V, No. 4, December 1954, "Calculation of HLB Values of Non-Ionic Surfactants."

The HLB values of a surface active agent of this invention can be varied by regulating the number and size of the ester groups attached to the sorbitan group and also by controlling the number of ethylene oxide groups which are attached to the sorbitan group. To increase the hydrophilic character either a smaller number of ester groupings is used or the number of ethylene oxide groups is increased. Conversely, to increase the lipophilic character of an agent it is necessary either to increase the number and/or size of the ester groups or to decrease the amount of ethylene oxide to be reacted with the ester.

From the above it will be seen that the waterproofing agent or surface active agent employed to improve the water-resistance characteristics of the greases of this invention must be one which has not only lipophilic characteristics but also hydrophilic characteristics and these characteristics must be balanced within certain limits. Thus if the HLB value is below about 9, the product is too oil-soluble and too water-insoluble to be of value, i.e., to impart the correct water resistance to the grease. On the other hand, if the HLB value is above about 12, the agent is too water-soluble and oil-insoluble to impart the desired water resistance to the grease. It is not merely a question of selecting an agent which is oil-soluble and water-insoluble to produce the desired effect in the non-soap greases as might have been expected since the idea appears to be basically one of making the grease system water-insoluble. The correct balance between hydrophilic and lipophilic characteristics is apparently one which gives a product sufficient hydrophilic characteristics to attach itself to the silica or alumina particles and yet the agent must have sufficient lipophilic characteristics to prevent water from again adhering to the powdered silica or alumina materials.

Lubricating oils which may be used in the preparation of the greases of this invention include mineral lubricating oils as well as synthetic ester-type lubricating oils. Such ester oils are well known in the art and are prepared by reacting a dibasic carboxylic acid such as sebacic acid or other similar dibasic carboxylic acid with a monohydroxy aliphatic alcohol such as for example 2-ethyl hexyl alcohol. Dibasic acids which may be employed in preparing the ester-type lubricating oils include the saturated aliphatic dicarboxylic acids containing about 8 to about 12 carbon atoms per molecule. The alcohols are the monohydroxy normal and branched chain saturated aliphatic alcohols containing 6 to 10 carbon atoms per molecule. Since such ester-type lubricating oils are well known in the art further description of these materials is not believed to be necessary here. The mineral lubricating oils may be of the naphthenic or paraffinic type and will include low viscosity oils such as gas oil up to and including bright stocks, cylinder stocks and the like. Generally the lubricating oils ranging from an SAE grade of 10 to 60 are employed in grease making operations and these are particularly suitable here.

The greases of this invention are prepared by combining lubricating oil, the surface active agent described herein, and finely divided silica and/or alumina with mixing, or preferably with milling, and subsequently heating the product with mixing to a temperature such as has been indicated hereinabove. The order of addition of the thickening agent and the surface active agent is not important since substantially the same product having the same characteristics is obtained regardless of which material is added first to the lubricating oil. It is essential that the finely divided silica and/or alumina be well dispersed and this is most readily accomplished by milling, using an ordinary paint mill, colloid mill or equivalent milling device. The dispersion of thickening agent in the lubricating oil or in the lubricating oil containing the surface active waterproofing agent is readily accomplished at room temperature, although if a product having a heavy grease body is desired it is sometimes advantageous to effect the dispersion at somewhat elevated temperatures.

Moreover, if the waterproofing agent is to be added subsequent to the dispersion of the thickening agent in the oil, this is readily accomplished at ordinary temperatures although somewhat elevated temperatures may again be used if desired. In any event, prior to complete dispersion, temperatures are preferably maintained below about 200–212° F.

Following the incorporation of both the thickening agent and the waterproofing agent, the mixture is heated with stirring or with paddle agitation in a grease kettle to a temperature of at least 250° F. and preferably at least 275–325° F. Temperatures above 350° F. are not needed to accomplish the desired effect. The grease is then cooled with continued agitation and is ready for packaging.

The amount of thickening agent, i.e. finely divided silica and/or alumina, to be used in preparing the greases of this invention will be between about 3% and about 30% by weight of the finished grease and preferably between about 5% and about 20% by weight of the grease, depending upon the consistency of the grease which is to be produced. The amount of polyoxyethylene sorbitan partial ester waterproofing agent to be employed will be between about 0.1% and about 10% by weight of the finished grease, and preferably between about 0.5% and about 7% by weight of the grease. In general the amount of the waterproofing agent to be used will depend upon the amount of silica and/or alumina employed. The smaller amounts of the waterproofing agent are employed when the smaller amounts of thickening agent are used and the larger amounts of waterproofing agent are employed when the larger amounts of thickening agent are used. In most instances the weight ratio of powdered silica and/or alumina to waterproofing agent in the grease will be between about 3 to 1 and about 30 to 1 and preferably between about 5 to 1 and about 20 to 1.

As would be understood by one skilled in the art the greases of this invention may be prepared with or without the incorporation of oxidation inhibitors. Such inhibitors for use in greases are well known and need not be described. They may be incorporated in the grease at any stage of its preparation.

In the following examples the penetrations are all determined at 77° F. by the ASTM method. Moreover, the boiling water test involves placing approximately 1 cubic centimeter of the grease in a beaker of boiling water for 15 minutes and determining the water resistance visually. All compositions are set forth in parts by weight.

These examples are illustrative of the invention and are not to be considered as limiting the scope of the invention.

*Example I*

A grease is prepared from the following ingredients:

9 parts colloidal silica (Cab-O-Sil)
1 part polyoxyethylene sorbitan tristearate, HLB value 10.5 (Tween 65)
90 parts mineral lubricating oil The mineral lubricating oil is a paraffinic lubricating oil having a V.I. of 86 and a viscosity at 210° F. of 52.5 SSU.

The silica and oil are mixed on a steel plate with a spatula and the waterproofing agent added and mixing continued. The cold mixture is then heated to 320° F. over a period of 10 minutes and then cooled with working. The product has good grease structure, an ASTM penetration of 260 at 77° F. and shows essentially no breakdown or tendency to emulsify in the boiling water test. A sample of this grease heated again to 320° F. and cooled without spatula working has an unworked penetration of 250 and a worked penetration of 260. Another sample of this product heated to 320° F. and spatula worked has a penetration of 260 at 77° F. and after standing for 2 weeks the unworked and worked penetrations are 240 and 245, respectively.

*Example II*

For purposes of comparison, Example I is repeated with the exception that the Tween 65 is omitted. This product has an ASTM penetration of 240. In the boiling water test the grease breaks down completely in about 5 minutes.

A sample of this grease heated again to 325° F. and cooled without spatula working has unworked and worked penetrations of 235 and 240, respectively. Another sample of the grease heated to 325° F. and spatula worked while cooling has a penetration of 240 and after standing 2 weeks the unworked and worked penetrations are 230 and 235, respectively.

*Example III*

A grease is prepared from the following ingredients:

9 parts colloidal silica (Cab-O-Sil)
1 part polyoxyethylene sorbitan monooleate, HLB value 10.0 (Tween 81)
88 parts mineral lubricating oil of Example I The three ingredients are mixed on a steel plate with a spatula. The resulting product is heated to 320° F. and cooled with working. The product shows essentially no breakdown in the boiling water test after 15 minutes and has a penetration of 265.

*Example IV*

Example I is repeated using polyoxyethylene sorbitan monostearate (Tween 61) as the waterproofing agent. This product has an HLB value of 9.6. The grease product is similar in characteristics to that of Example I.

*Example V*

Example I is repeated using a silica aerogel having a specific surface area of about 157 square meters per gram in place of the colloidal silica. The product is similar to that of Example I. It is resistant to boiling water and has a penetration of 265.

*Example VI*

Example I is repeated using a paint mill to disperse the thickening agent in the oil. The product is similar to that of Example I although it has a somewhat lower penetration, i.e. 245 at 77° F.

*Example VII*

Example I is repeated using a synthetic ester type lubricating oil, prepared by esterifying sebacic acid with 2-ethyl hexanol, in place of the mineral lubricating oil. The synthetic oil has a viscosity at 100° F. of 68.6 SSU and a viscosity index of 150.

The grease produced shows good resistance to boiling water and has unworked and worked penetrations of 270 and 310, respectively.

*Example VIII*

A grease is prepared from the following ingredients:

20 parts silica aerogel
5 parts polyoxyethylene sorbitan trioleate, HLB value 11.0 (Tween 85)
75 parts SAE 30 paraffinic mineral lubricating oil The waterproofing compound is dissolved in the mineral lubricating oil and to this solution is added the silica aerogel having a specific surface area of about 157 square meters per gram. After the mass is mixed it is passed through a paint mill to effect good dispersion. The milled product is placed in a grease kettle where it is heated, with agitation, to a temperature of 300° F. and then cooled.

This product shows no breakdown in the boiling water test and it has excellent reversibility characteristics.

Example IX

Example VIII is repeated using a mixture of equal parts by weight of finely divided colloidal silica as used in Example I and the silica aerogel used in Example VIII, a total of 20 parts of the thickening agent being used. The resulting grease is substantially the same as that of Example VIII.

Example X

A grease is prepared following the procedure of Example VIII using the following ingredients:

15 parts colloidal silica (Cab-O-Sil)
3 parts polyoxyethylene sorbitan dilaurate, HLB value 10.0 (oil-soluble, water-dispersible)
82 parts SAE 20 paraffinic lubricating oil The resulting grease is water resistant and has good reversibility characteristics.

Example XI

A grease is prepared following the procedure of Example I using alumina aerogel as the thickening agent. The resulting grease is slightly softer than that of Example I but is water resistant and has good reversibility characteristics.

Example XII

A grease is prepared following the procedure of Example I using equal parts of colloidal silica and colloidal alumina as the thickening agent. The product is substantially the same as that of Example I.

The above description and examples are illustrative of the invention but are not to be considered as limiting as variations may be made by one skilled in the art without departing from the spirit or the scope of the following claims.

I claim:

1. A water-resistant grease consisting essentially of lubricating oil of the class consisting of mineral lubricating oil and ester lubricating oil, said ester lubricating oil being an ester of a saturated aliphatic dicarboxylic acid of 8 to 12 carbon atoms and a monohydroxy saturated aliphatic alcohol of 6 to 10 carbon atoms containing between about 3% and about 30%, based on the grease, of a finely divided thickening agent of the class consisting of silica, alumina, and mixtures thereof, and small amounts, between about 0.1% and about 10% by weight of the grease, sufficient to impart water resistance to the grease upon heating the mixture to a least 250° F., of a polyoxyethylene sorbitan partial ester of a long chain fatty acid of 12 to 22 carbon atoms per molecule and having a hydrophile-lipophile balance value between about 9 and about 12.

2. A grease according to claim 1 in which said thickening agent has a specific surface area between 10 and 1000 square meters per gram.

3. A grease according to claim 1 in which said thickening agent is a colloidal silica having a specific surface area between 25 and 500 square meters per gram.

4. A grease according to claim 1 in which said partial ester contains 1 to 3 ester groups.

5. A grease according to claim 1 in which said lubricating oil is a mineral lubricating oil.

6. A grease according to claim 1 in which said lubricating oil is an ester of a saturated aliphatic dicarboxylic acid of 8 to 12 carbon atoms and a monohydroxy saturated aliphatic alcohol of 6 to 10 carbon atoms.

7. A grease according to claim 1 in which said thickening agent is a mixture of finely divided silica and alumina.

8. A grease according to claim 1 in which said sorbitan derivative is polyoxyethylene sorbitan tristearate having a hydrophile-lipophile balance value of 10.5.

9. A grease according to claim 1 in which said sorbitan derivative is a polyoxyethylene sorbitan monooleate having a hydrophile-lipophile balance value of 10.0.

10. A method of preparing a lubricating grease which comprises mixing a lubricating oil of the class consisting of mineral lubricating oil and ester lubricating oil, said ester lubricating oil being an ester of a saturated aliphatic dicarboxylic acid of 8 to 12 carbon atoms and a monohydroxy saturated aliphatic alcohol of 6 to 10 carbon atoms, 3% to 30% by weight based on the grease of a finely divided thickening agent of the class consisting of silica, alumina and mixtures thereof, and 0.1% to 10% by weight based on the grease of a polyoxyethylene sorbitan partial ester of a long chain fatty acid having 12 to 22 carbon atoms per molecule and having a hydrophile-lipophile balance value of between about 9 and about 12, and heating the mixture to a temperature of at least 250° F. to impart water-resistance characteristics to said grease.

11. A method according to claim 10 in which said thickening agent is first milled into the lubricating oil, said polyoxyethylene sorbitan partial ester then being added to the thickened oil.

12. A method according to claim 10 in which said polyoxyethylene sorbitan partial ester is first dissolved in said lubricating oil and the thickening agent is mixed into the oil containing said compound by means of milling.

13. A method according to claim 10 in which said mixture of oil, thickening agent and polyoxyethylene sorbitan partial ester is heated with mixing to a temperature in the range of 300°–350° F.

14. A method according to claim 10 in which said lubricating oil is a mineral lubricating oil.

15. A method according to claim 10 in which said lubricating oil is an ester of a saturated aliphatic dicarboxylic acid of 8 to 12 carbon atoms and a monohydroxy saturated aliphatic alcohol of 6 to 10 carbon atoms.

16. A method according to claim 10 in which said thickening agent is a finely divided silica having a specific surface area of 25 to 500 square meters per gram.

References Cited in the file of this patent

UNITED STATES PATENTS

| | | |
|---|---|---|
| 2,573,650 | Peterson | Oct. 30, 1951 |
| 2,652,361 | Woods et al. | Sept. 15, 1953 |
| 2,746,922 | Braendle | May 22, 1956 |

FOREIGN PATENTS

| | | |
|---|---|---|
| 512,342 | Canada | Apr. 26, 1955 |

OTHER REFERENCES

Atlas Surface Active Agents, published by Atlas Powder Co., Wilmington 99, Del., 1948, page 26, Table 1.